US011524632B2

(12) United States Patent
Pantea et al.

(10) Patent No.: US 11,524,632 B2
(45) Date of Patent: Dec. 13, 2022

(54) POWER RUNNING BOARD WITH SEALED BUSHINGS

(71) Applicant: Magna Exteriors Inc., Concord (CA)

(72) Inventors: Sorin Ovidiu Pantea, Woodbridge (CA); Robert Dale Brimm, Royal Oak, MI (US); Kevin C. Molligoda, Toronto (CA); Jason D'Antimo, Bradford (CA)

(73) Assignee: MAGNA EXTERIORS, INC., Concord (CA)

( * ) Notice: Subject to any disclaimer, the term of this patent is extended or adjusted under 35 U.S.C. 154(b) by 231 days.

(21) Appl. No.: 16/877,682

(22) Filed: May 19, 2020

(65) Prior Publication Data

US 2020/0369209 A1 Nov. 26, 2020

Related U.S. Application Data

(60) Provisional application No. 62/850,067, filed on May 20, 2019.

(51) Int. Cl.
*B60R 3/00* (2006.01)
*B62D 35/02* (2006.01)
*B60R 3/02* (2006.01)

(52) U.S. Cl.
CPC ............... *B60R 3/002* (2013.01); *B60R 3/02* (2013.01); *B62D 35/02* (2013.01)

(58) Field of Classification Search
CPC ................................. B60R 3/02; B60R 3/002
See application file for complete search history.

(56) References Cited

U.S. PATENT DOCUMENTS

| 6,322,035 | B1 * | 11/2001 | D'Antimo | B60N 2/0825 |
| | | | | 248/429 |
| 6,942,233 | B2 * | 9/2005 | Leitner | B60R 3/02 |
| | | | | 280/727 |
| 7,487,986 | B2 * | 2/2009 | Leitner | B60R 3/02 |
| | | | | 280/166 |
| 9,550,458 | B2 * | 1/2017 | Smith | B60R 3/02 |
| 10,150,419 | B2 * | 12/2018 | Derbis | B60R 3/02 |
| 10,479,278 | B2 * | 11/2019 | Du | B60R 3/02 |
| 10,618,472 | B2 * | 4/2020 | Du | F16H 1/16 |
| 2008/0116653 | A1 * | 5/2008 | Piotrowski | B60R 3/002 |
| | | | | 280/166 |
| 2017/0355315 | A1 * | 12/2017 | Leitner | B60R 3/02 |
| 2018/0281687 | A1 * | 10/2018 | Derbis | B60R 3/002 |

* cited by examiner

*Primary Examiner* — Hau V Phan
(74) *Attorney, Agent, or Firm* — Warn Partners, P.C.

(57) ABSTRACT

A moveable link for an active exterior component on a vehicle. The moveable link provides a sealed connection between the outer link and the base link and fixed link. This sealed connection prevents debris from contaminating the area where the outer link rotates about the pin, thereby preventing unwanted noises. Furthermore, the sealed connection also prevent corrosion between the outer link and the pin, which can lead to failure of the moveable link.

10 Claims, 7 Drawing Sheets

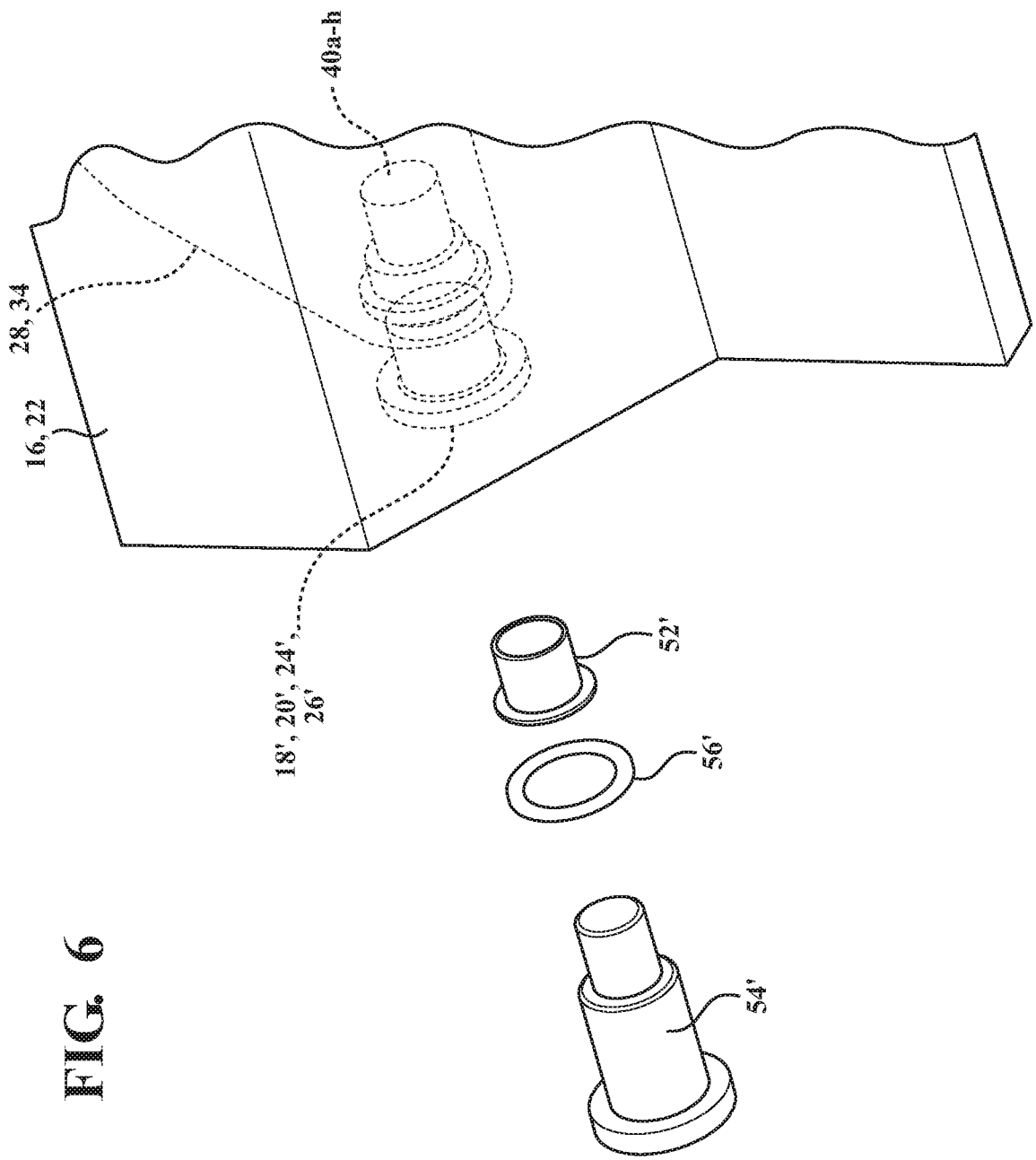

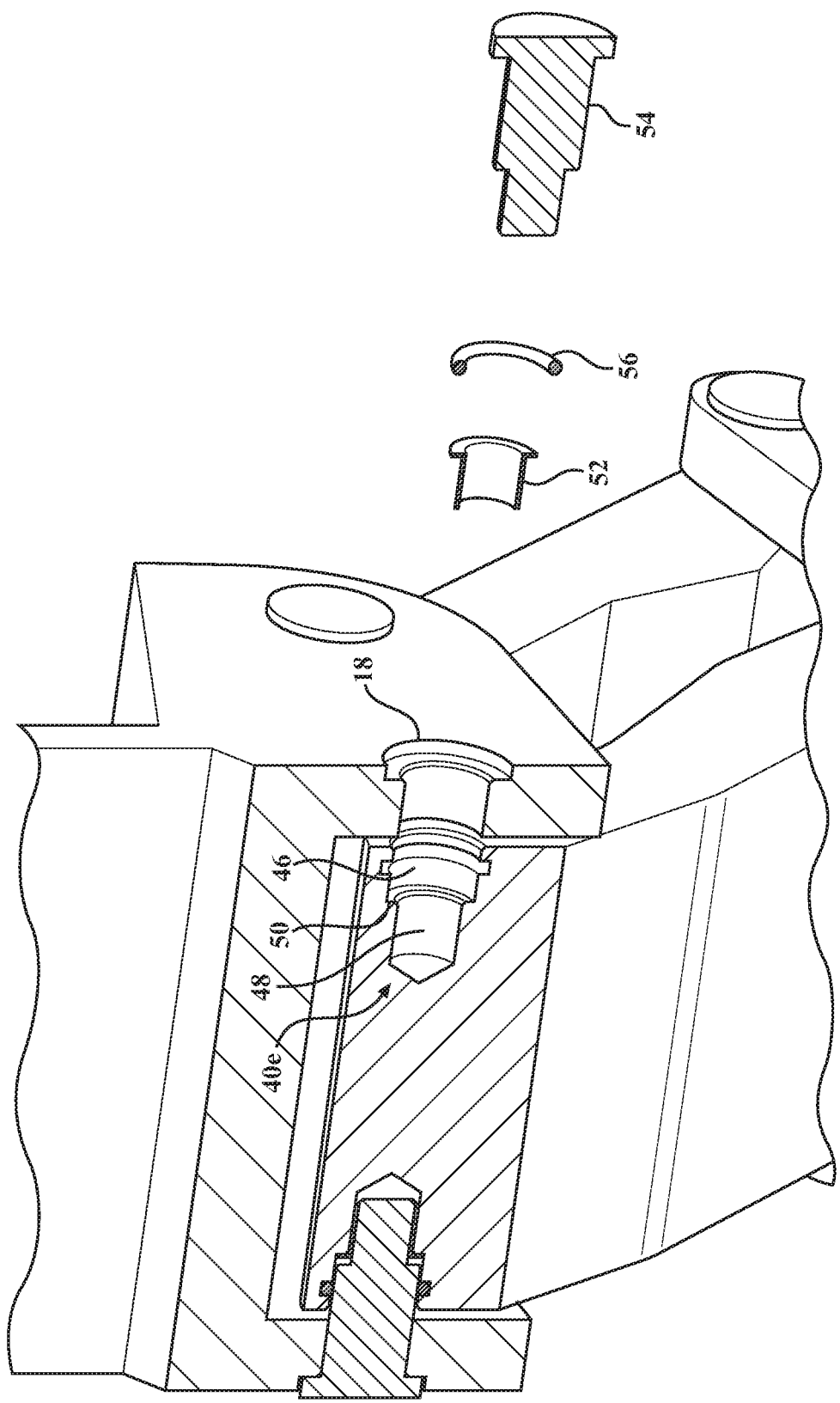

… (1) …

POWER RUNNING BOARD WITH SEALED BUSHINGS

FIELD OF THE INVENTION

The present invention relates to a power running board with sealed bushings.

BACKGROUND OF THE INVENTION

In the automotive field there has been an increased demand for providing exterior components that are movable or "active" in that the component will move between a deployed and underplayed position. One particular example is a vehicle running board that will move to a deployed position, making the step visible and usable to a person entering the vehicle, when the vehicle door is opened. The active running board will also move to a retracted position, where the step is no longer visible and stowed away when the vehicle door is closed, thereby making the vehicle more aerodynamic by placing the step closer to the vehicle body. Other examples of active exterior components include movable spoilers, tailgate steps and active underbody air dams. All of the active exterior components have some type of linkage that allows the component to move between the retracted and deployed positions. These linkages typically have several pieces that pivot relative to one another at various pivot points or axis points. Also, the linkages are exposed to the environment outside of the vehicle and can experience corrosion due to the presence of moisture, salt or other chemicals found externally to the vehicle. In addition to corrosion, dirt, dust, or other particles can contaminate the area of the linkage. The corrosion and contamination at the pivot points can cause binding or failure of the linkage and undesirable sounds such as squeaking during operation. It is therefore desirable to develop movable links that resist corrosion. It is further an object of the invention to provide a movable link that resists or accommodates dirt, debris, or other unwanted materials, thereby preventing unwanted sounds as the linkage moves between the deployed and stowed positions.

FIG. 1 depicts a partial cross sectional plan view of a portion of a moveable link 200 according to the prior art. The cross section shows a connection 202 between a fixed link or base link 210 and an outer link or inner link 216. A moveable link will typically have at least two with possibly more connections of the type shown in FIG. 1. The outer link or inner link 216 has a bore 212 with a press fit pin 214 placed in the bore 212. The ends of the press fit pin 214 extend into apertures 218, 218' of the fixed link or base link 210. The outer or inner link 216 and the press fit pin 214 are configured to rotate with respect to the fixed link or base link 210. To facilitate the rotation of the outer or inner link 216 a bushing 220, 220' typically made of stainless steel or aluminum is positioned in the aperture 218, 218' and the ends of the press fit pin 214 slide into the bushing 220, 220'. The ends of the pin 214 rotate within the bushing 220, 220' which also allows the outer or inner link 216, which are press fit with the pin 214 to also rotate. One problem that occurs is that the area around the bushing 220,220' will corrode. The corrosion can occur on the bushing 220,220' itself as well as on the pin 214, and the fixed link or base link 210. It is therefore desirable to seal this area off from the outside environment. It is also desirable to move the connection point more inward on the moveable link to further protect the connection from corrosion.

SUMMARY OF THE INVENTION

The present invention is directed to moveable link for an active exterior component on a vehicle comprising having sealed connections to prevent unwanted corrosion and contamination. The moveable link includes a fixed link connected to a vehicle body. Typically, the fixed link connects to the frame or other supporting structure depending on the application. Further provided is a base link connected to a vehicle exterior component. Examples of vehicle exterior components include, but are not limited to a running board, step, spoiler, and underbody air deflector.

Pivotally connected between the base link and the fixed link is an outer link that allows the moveable link to move between a stowed and extended position. The outer link includes at least two connections between the outer link and the base link, which include a pin fixedly connected to the base link. The pin extends through a bore, a first seat, a first bushing, a second bushing and a second seal of the outer link, where the bore includes an aperture that the pin extends through at a first end of the bore and an aperture that the pin extends through at a second end of the bore. The first seal is located between the aperture at the first end and the first bushing. The second seal is located between the aperture at the second end and the second bushing that the pin extends through. The least two connections between the outer link and the fixed link, include a pin fixedly connected to the fixed link, the pin extends through a bore, a first seat, a first bushing, a second bushing and a second seal of the outer link. The bore includes an aperture that the pin extends through at a first end of the bore and an aperture that the pin extends through at a second end of the bore. The first seal is located between the aperture at the first end and the first bushing and the second seal is located between the aperture at the second end and the second bushing that the pin extends through.

The moveable link described above provides a sealed connection between the outer link and the base link and fixed link. This sealed connection prevents debris from contaminating the area where the outer link rotates about the pin, thereby preventing unwanted noises. Furthermore, the sealed connection also prevent corrosion between the outer link and the pin, which can lead to failure of the moveable link.

BRIEF DESCRIPTION OF THE DRAWINGS

The present invention will become more fully understood from the detailed description and the accompanying drawings, wherein:

FIG. 6 is an enlarged side exploded perspective view of the pin, seal, and bushing of the second embodiment of the present invention.

FIG. 7 is an enlarged exploded front cross sectional view of the pin, seal and bushing of the second embodiment of the invention.

DETAILED DESCRIPTION OF THE PREFERRED EMBODIMENTS

Figure 2:
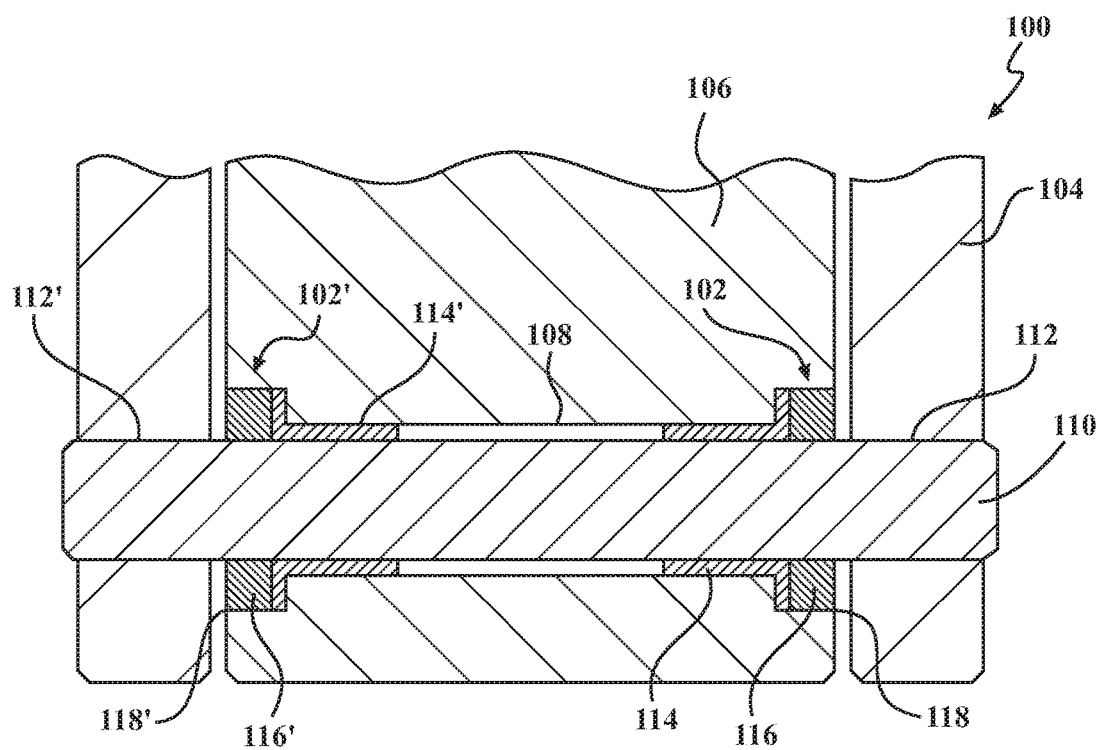
FIG. 2 is a cross-sectional schematic view of a portion of a moveable link according to a first embodiment of the present invention.
Figure 3A:
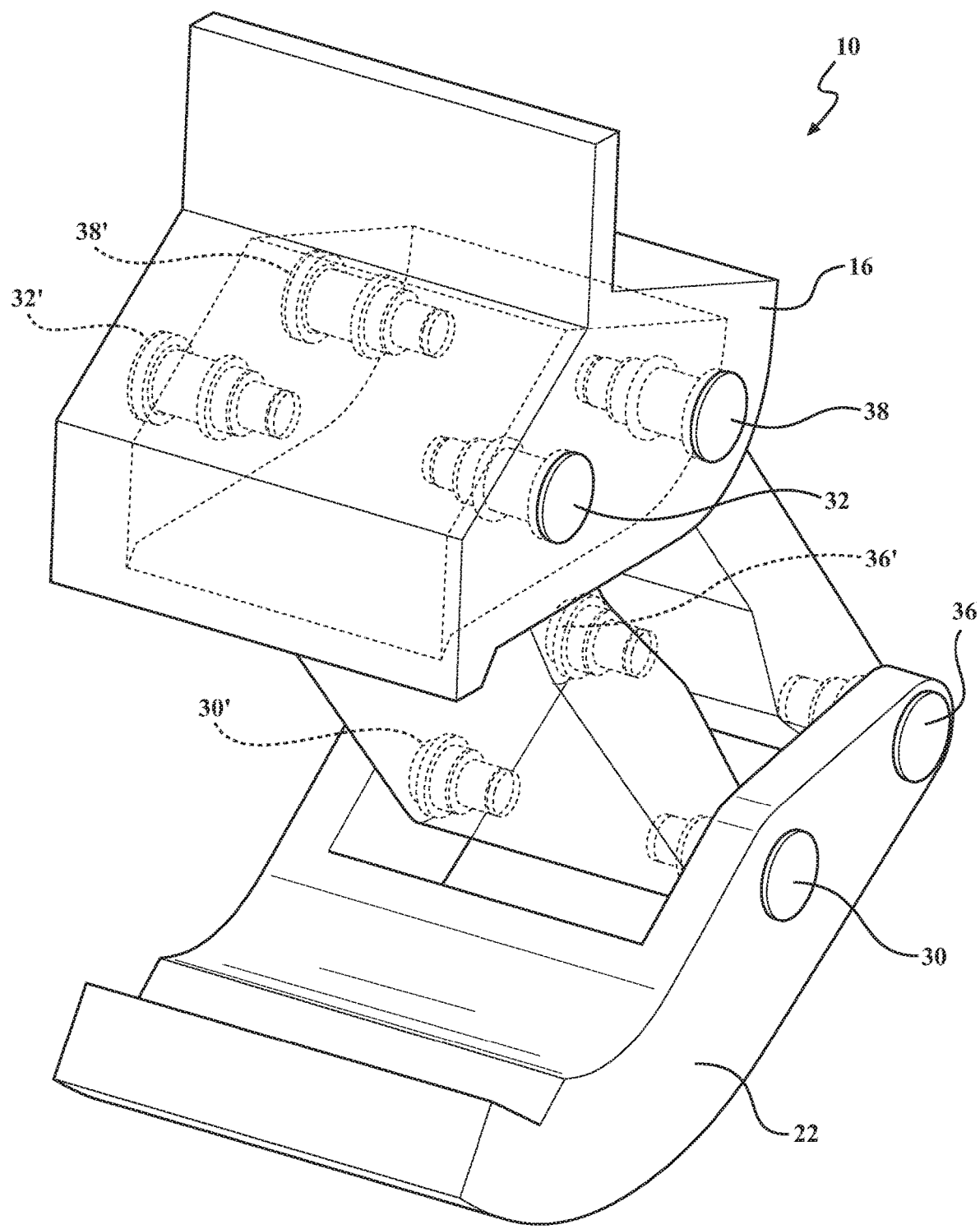
FIG. 3A is a perspective side view of a moveable link according to a second embodiment of the invention.
Figure 3B:
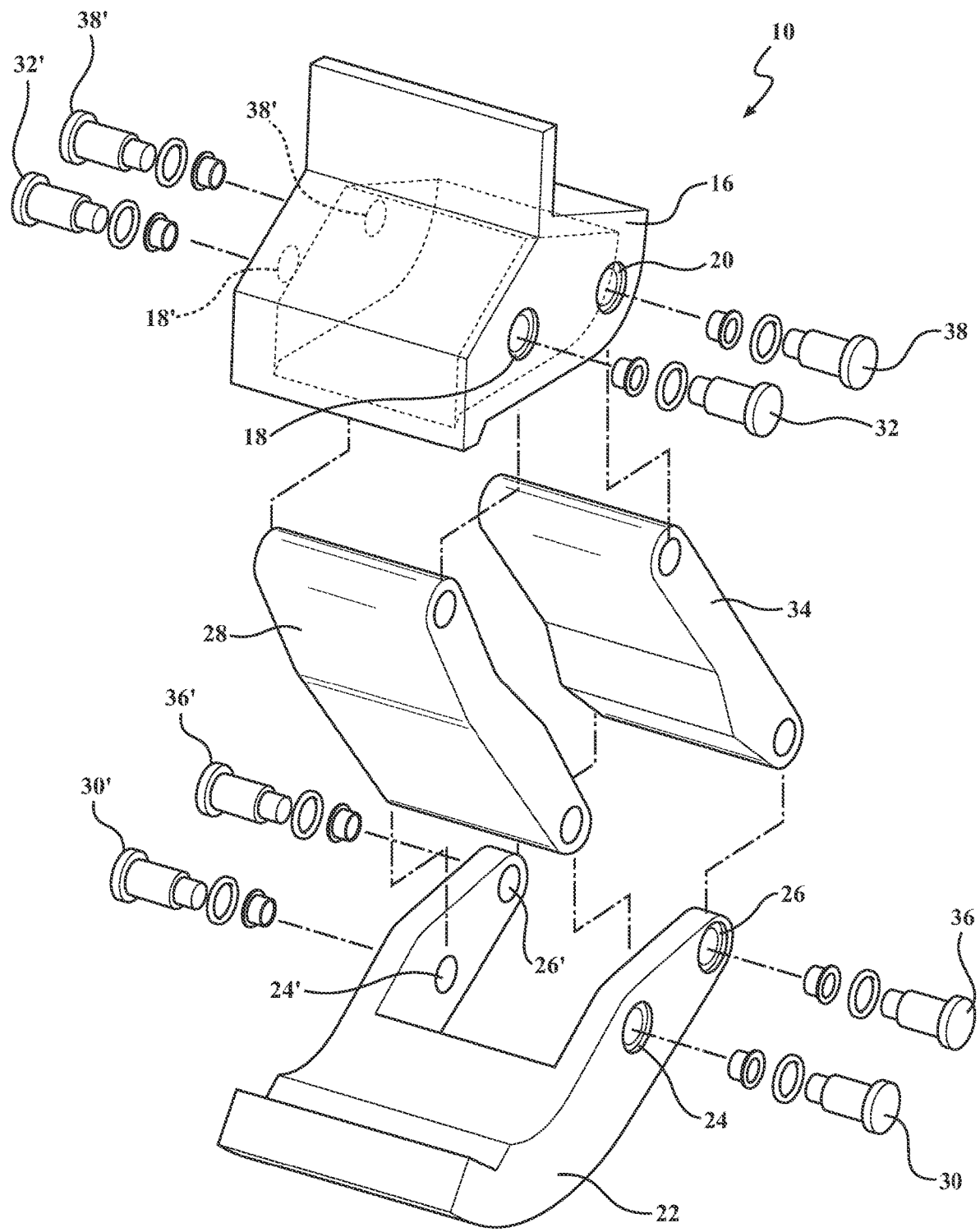
FIG. 3B is an exploded perspective side view of a moveable link according to the second embodiment of the invention.
Figure 4:
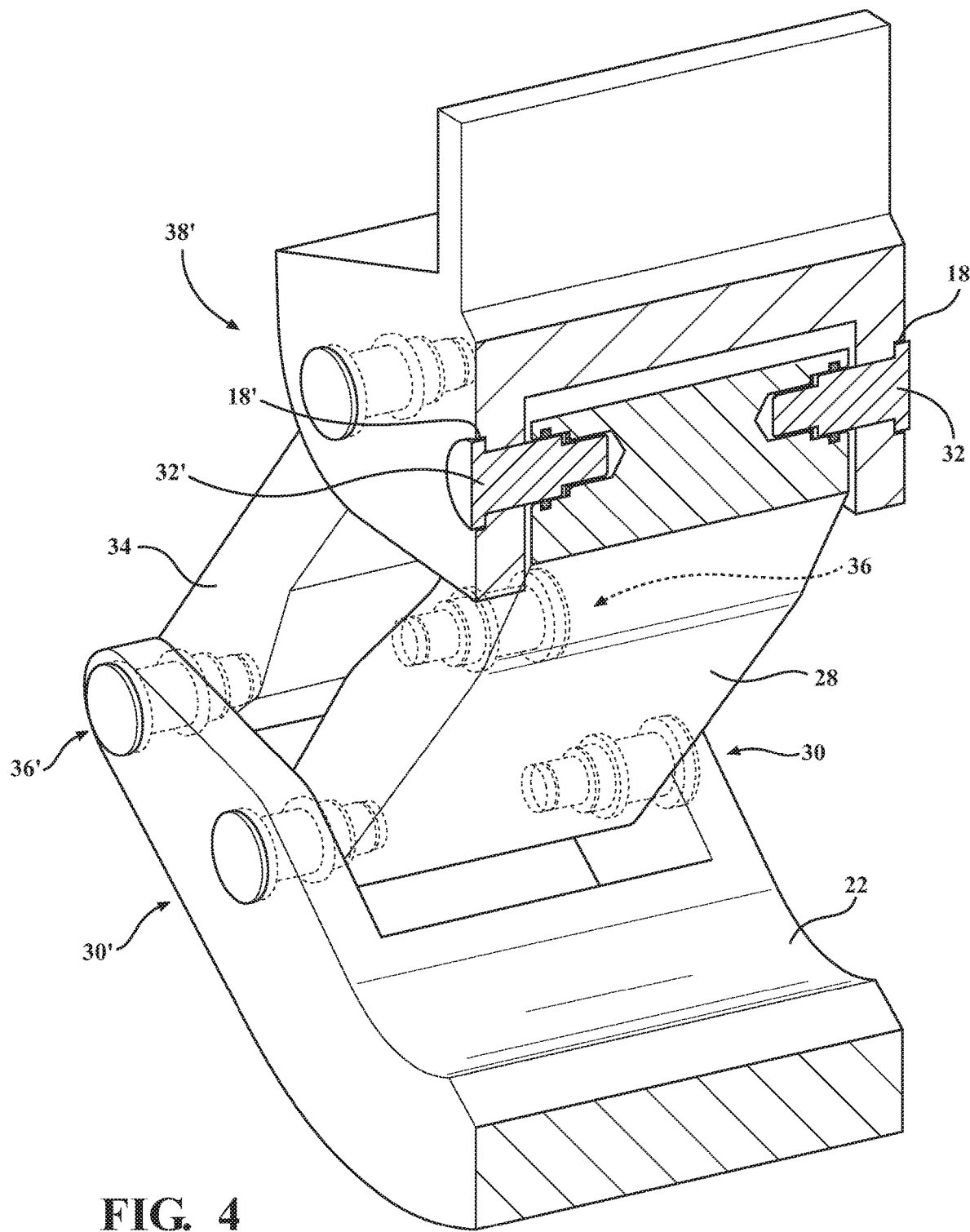
FIG. 4 is a perspective side partial cross section view of a moveable link according to the second embodiment of the invention.

The following description of the preferred embodiments is merely exemplary in nature and is in no way intended to limit the invention, its application, or uses. FIG. 2 depicts a partial cross sectional plan view of a portion of a moveable link 100 according to on embodiment of the present invention. The cross section shows two connections 102, 102' between a fixed link or base link 104 and an outer link or inner link 106. While two connections are shown it is possible for additional connection to be used. For example, FIGS. 3-7 show eight connections with individual pins at each connection. In contrast the present embodiment of the invention can be used to provide the same number of connections, while reducing the number of pins. As shown in FIG. 2 the outer link or inner link 106 has a bore 108 with a pin 110 placed in the bore 108. The present embodiment of the invention differs from FIGS. 3-7 in that the pin 110 is a single pin used for two different connections.

The ends of the pin 110 extend into apertures 112, 112' of the fixed link or base link 104, while the body of the pin 110 extends through the bore 108. Within the bore 108 are bushings 114, 114' that the pin 110 is disposed through and allow the outer or inner link 106 to rotate about the pin 110. About the pin 110, outward from the bushings 114, 114', are seals 116, 116' that are positioned within apertures 118, 118' of the bore 108 in order to seal or prevent the bushings 114, 114' from being exposed to the outside environment and to prevent moisture from coming into the contact with the connections 102, 102'. The outer or inner link 106 is configured to rotate about the pin 108, which is held stationary by the press fit connection with the fixed or base link 104. The press fit connection prevents corrosion between the pin and the fixed link or base link 104.

Referring now to FIGS. 3-7 depict various views of a movable link 10 for an active exterior component used in connection with the vehicle, in accordance with a second embodiment of the invention. This embodiment differs from the embodiment shown in FIG. 2 in that there is a total of eight pin connections used instead of four pins, where a single pin extends through the moveable link and is used for two connections.

The movable link 10 as well as the moveable link 100 shown in FIG. 2 are used for a variety of components such as running board brackets, spoilers, front air dams, rear air dams or other movable components located on the exterior of the vehicle. The exterior component is connected to the body of a vehicle at a suitable location. In one exemplary embodiment of the invention the movable link 10, 100 is for a vehicle running board connected to a frame of the vehicle body and moves the vehicle exterior component between a fully extended position and a retracted position or any position there between.

Referring to FIGS. 3-7 it is anticipated that the movable link 10 shown is used as part of a running board for a vehicle. The movable link 10 includes a fixed link 16 connected to the vehicle body. The fixed link 16 has a total of four apertures, two outer apertures 18, 18' and two inner apertures 20, 20'. There is also a base link 22 that connects with a vehicle component such as a running board. In other embodiments the base link 22 is connected to an air dam, spoiler, or some other actively moveable component. The base link 22 has a total of four apertures that being two outer apertures 24, 24' and two inner apertures 26, 26'.

The moveable link 10 also includes an outer link 28 that is pivotally connected to the base link 22 by two first outer link connections 30, 30' and pivotally connected to the fixed link 16 by two second outer link connections 32, 32'. Additionally, there is an inner link 34 that is pivotally connected to the base link 22 by two first inner link connections 36, 36' and pivotally connected to the fixed link 16 by two second inner link connections 38, 38'.

Figure 5:
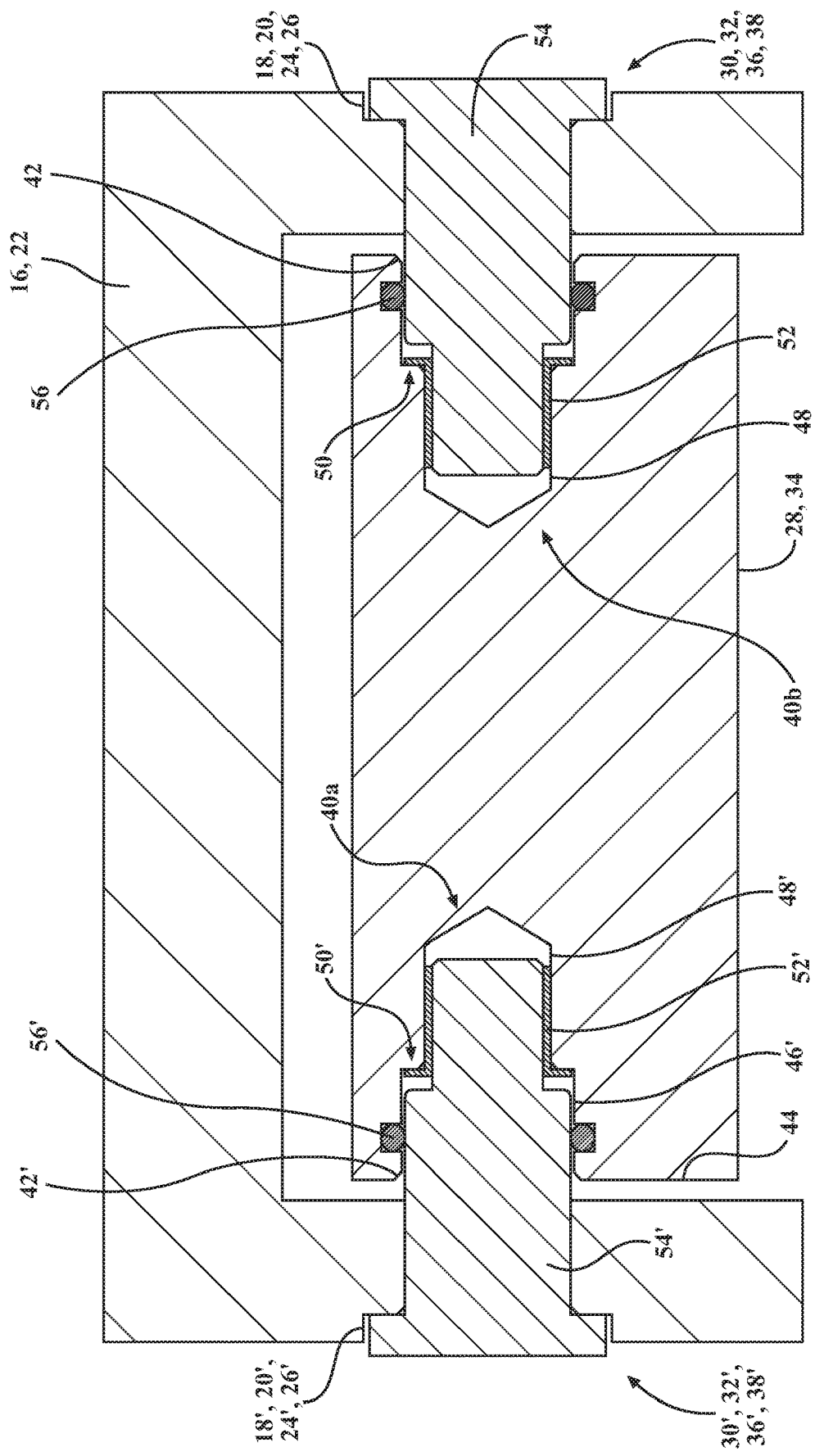
FIG. 5 is a cross-sectional plan schematic view of a portion of a moveable link according to the embodiment of the present invention.

Each one of the two first outer link connections 30, 30', two second outer link connections 32, 32', two first inner link connections 36, 36' and two second inner link connections 38, 38' have a bore 40, 40b, which is shown in the general view depicted in FIGS. 5 and 6. In FIGS. 5 and 6 the detailed structure of each bore 40a, 40b is shown. Each bore 40a, 40b has an opening 42, 42' on an outer surface 44 of the respective inner link 34 or outer link 28, a first diameter portion 46, 46' connected to a second diameter portion 48, 48' by a busing seat surface 50, 50'. The first diameter portion 46, 46' is larger in diameter than the second diameter portion 48, 48'. A bushing 52, 52' is seated on the bushing seat surface 50, 50'. A pin 54, 54' extends through the bushing 52, 52', bore 40a, 40b and the opening 42, 42'. Once outside of the opening 42, 42' the pin 54, 54' extends to and connects to a respective one of the fixed link 16 or base link 22 at one of the respective outer apertures 18, 18', 24, 24' or inner apertures 20, 20', 26, 26'. The outer link 28 or inner link 34 are able to pivot about the pin 54, 54' at the surface between the pin 54, 54' and the bushing 52, 52'. The bushing 52, 52' is typically made of metal or alloy such as steel, aluminum or even polymer material.

Figure 1:
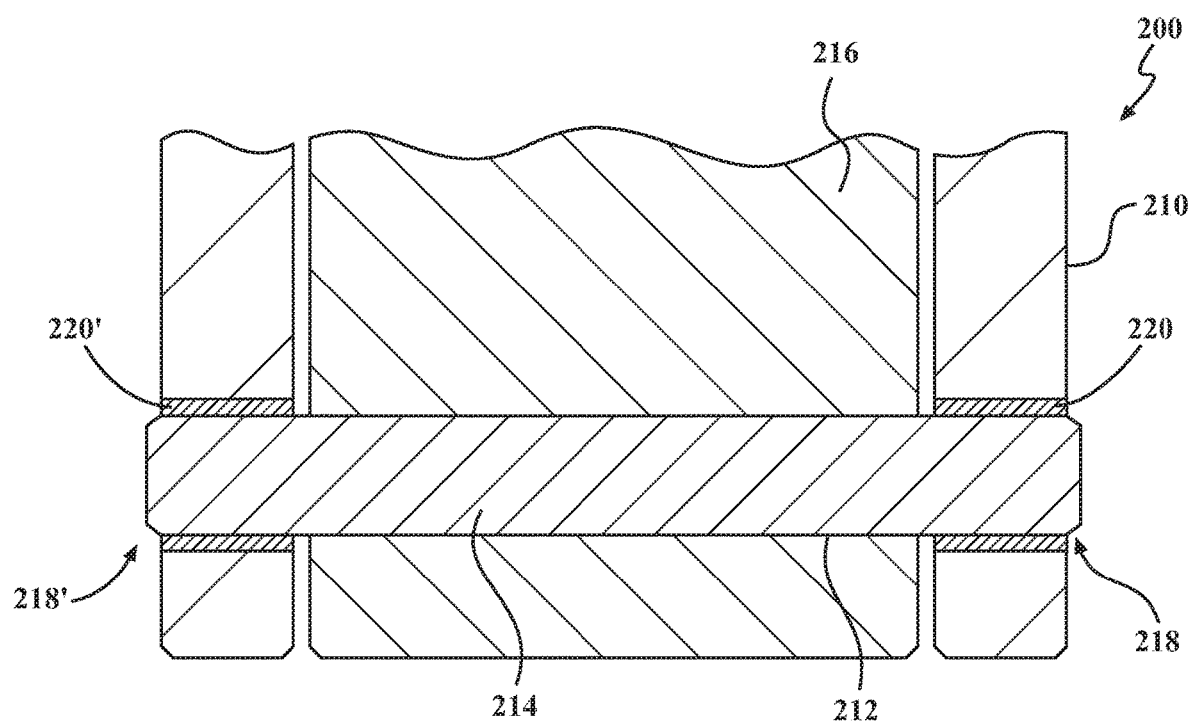
FIG. 1 is a cross-sectional schematic view of a portion of a moveable link according to the prior art.

In the prior art embodiment described above with respect to FIG. 1 corrosion has been a problem in the area around the bushing, pin, and link components. The present embodiment of the invention addresses this problem by placing the bushing 52, 52' and pin 54, 54' interface more inward from the outer surface 44 of the outer link 28 or inner link 34. Additionally, in the first diameter portion 46, 46' there is a seal 56, 56' that is disposed around the pin 54, 54' outward from the busing 52, 52'. The seal 56, 56' further prevents the intrusion of moisture, dirt other contaminants from getting into the bushing 52, 52' and pin 54, 54' interface. In the present embodiment of the invention a single seal is shown, however, it is within the scope of the invention for additional seals to be utilized. The seal 56, 56' is elastomeric however, it is within the scope of this invention for the seal to be made of other material such as thermoplastic, metal or alloy material.

The present embodiment shown in FIGS. 3-6 is in contrast the embodiment shown in FIG. 2 which depicts one inner bore or one outer bore that extends all the way through the outer or inner link 106. This concept allows for sealing of the components that are most prone to corrosion and have the largest impact of binding of linkages, with the use of a single pin and 2 seals. The moveable link 10 can also further include an actuator for driving the movable link and the vehicle exterior component between a retracted position, extended position, and intermediate position. The actuator can be connected in a variety of ways.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A moveable link for an active exterior component on a vehicle comprising:
   a fixed link connected to a vehicle body;
   a base link connected to a vehicle exterior component;
   an outer link pivotally connected between the base link and the fixed link;
   at least two connections between the outer link and the base link, including a single pin fixedly connected to the base link, the single pin is used for the at least two connections, the single pin extends through a bore, a first seal, a first bushing, a second bushing and a second seal of the outer link, wherein the bore includes an aperture that the single pin extends through at a first end of the bore and an aperture that the single pin extends through at a second end of the bore, the first seal is located between the aperture at the first end and the first bushing and the second seal is located between the aperture at the second end and the second bushing that the single pin extends through, and
   at least two connections between the outer link and the fixed link, including a single pin fixedly connected to the fixed link, the single pin is used for the at least two connections, the single pin extends through a bore, a first seal, a first bushing, a second bushing and a second seal of the outer link, wherein the bore includes an aperture that the single pin extends through at a first end of the bore and an aperture that the single pin extends through at a second end of the bore, the first seal is located between the aperture at the first end and the first bushing and the second seal is located between the aperture at the second end and the second bushing that the single pin extends through.

2. The moveable link of claim 1 further comprising:
   an inner link pivotally connected between the base link and the fixed link;
   at least two connections between the inner link and the base link, including a single pin fixedly connected to the base link, the single pin is used for the at least two connections, the single pin extends through a bore, a first seal, a first bushing, a second bushing and a second seal of the inner link, wherein the bore includes an aperture that the single pin extends through at a first end of the bore and an aperture that the single pin extends through at a second end of the bore, the first seal is located between the aperture at the first end and the first bushing and the second seal is located between the aperture at the second end and the second bushing that the single pin extends through;
   at least two connections between the inner link and the fixed link, including a single pin fixedly connected to the fixed link, the single pin is used for the at least two connections, the single pin extends through a bore, a first seal, a first bushing, a second bushing and a second seal of the inner link, wherein the bore includes an aperture that the single pin extends through at a first end of the bore and an aperture that the single pin extends through at a second end of the bore, the first seal is located between the aperture at the first end and the first bushing and the second seal is located between the aperture at the second end and the second bushing that the single pin extends through.

3. The moveable link of claim 2 further comprising:
   the single pin of the at least two connections between the inner link and the base link include a press fit connection between the single pin and the base link, thereby preventing corrosion between the single pin and the base link;
   the single pin of the at least two connections between the inner link and the fixed link include a press fit connection between the single pin and the fixed link, thereby preventing corrosion between the single pin and the fixed link;
   the single pin of the at least two connections between the outer link and the base link include a press fit connection between the single pin and the base link, thereby preventing corrosion between the single pin and the base link; and
   the single pin of the at least two connections between the outer link and the fixed link include a press fit connection between the single pin and the fixed link, thereby preventing corrosion between the single pin and the fixed link.

4. The moveable link of claim 1 further comprising:
   the single pin of the at least two connections between the outer link and the base link include a press fit connection between the single pin and the base link, thereby preventing corrosion between the single pin and the base link; and
   the single pin of the at least two connections between the outer link and the fixed link include a press fit connection between the single pin and the fixed link, thereby preventing corrosion between the single pin and the fixed link.

5. The movable link of claim 1, wherein the vehicle exterior component is one selected from the group consisting of a running board, step, spoiler, and underbody air deflector.

6. The movable link of claim 1, wherein the body of the bushing has a flange extending perpendicular to the aperture.

7. A moveable link for an active exterior component on a vehicle comprising:
   at least one moveable link for moving a vehicle exterior component between a fully extended position and retracted position or any position there between;
   a fixed link of the at least one movable link connected to a vehicle body, wherein the fixed link has two outer apertures and two inner apertures;
   a base link of the at least one movable link connected to the vehicle exterior component, wherein the base link has two outer apertures and two inner apertures;
   an outer link of the at least one movable link pivotally connected to the base link by two first outer link connections, the outer link also being pivotally connected to the fixed link by two second outer link connections, wherein the two first outer link connections and the two second outer link connections each include at least one bore having an opening on an outer surface of the outer link, the at least one bore has at least one first diameter portion and is connected at a bushing seat surface with a second diameter portion that is smaller than the at least one first diameter portion and a bushing seated on the bushing seat surface with a single pin that extends through the bushing and the bore, the single pin extends outside of the outer link through the two outer apertures of the base link and the two outer apertures of the inner apertures of the fixed link;

an inner link of the at least one movable link pivotally connected to the base link by two first inner link connections, the inner link also being pivotally connected to the fixed link by two second inner link connections, wherein the two first inner link connections and the two second inner link connections each include at least one bore having an opening on an outer surface of the inner link, the at least one bore has at least one first diameter portion and is connected at a bushing seat surface with a second diameter portion that is smaller than the at least one first diameter portion and a bushing seated on the bushing seat surface with a single pin that extends through the bushing and the bore, the single pin extends outside of the inner link through the two outer apertures of the base link and the two inner apertures of the inner apertures of the fixed link, and wherein the two first outer link connections, the two second outer link connections, the two first inner link connections and the two second inner link connections each include a seal located in the first diameter portion circumscribing the single pin.

8. The moveable link of claim 7 further comprising:

the single pin of the two first inner link connections between the inner link and the base link include a press fit connection between the single pin and the base link, thereby preventing corrosion between the single pin and the base link;

the single pin of the two second inner link connections between the inner link and the fixed link include a press fit connection between the single pin and the fixed link, thereby preventing corrosion between the single pin and the fixed link;

the single pin of the two first outer link connections between the outer link and the base link include a press fit connection between the single pin and the base link, thereby preventing corrosion between the single pin and the base link; and the single pin of the two second outer link connections between the outer link and the fixed link include a press fit connection between the single pin and the fixed link, thereby preventing corrosion between the single pin and the fixed link.

9. The movable link of claim 7, wherein the vehicle exterior component is one selected from the group consisting of a running board, step, spoiler, and underbody air deflector.

10. The movable link of claim 7, wherein the body of the bushing has a flange extending perpendicular to the aperture.

* * * * *